(12) United States Patent
Mazrooee et al.

(10) Patent No.: US 10,294,768 B2
(45) Date of Patent: May 21, 2019

(54) ADAPTATION OF FRACTURING FLUIDS (71) Applicant: Halliburton Energy Services, Inc., Houston, TX (US)

(72) Inventors: Mehdi Mazrooee, Double Oak, TX (US); Michael Linley Fripp, Carrollton, TX (US); Leopodo Sierra, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 15/029,597

(22) PCT Filed: Nov. 14, 2013

(86) PCT No.: PCT/US2013/070107
§ 371 (c)(1),
(2) Date: Apr. 14, 2016

(87) PCT Pub. No.: WO2015/073005
PCT Pub. Date: May 21, 2015

(65) Prior Publication Data
US 2016/0265330 A1    Sep. 15, 2016

(51) Int. Cl.
*E21B 43/26* (2006.01)
*E21B 47/06* (2012.01)
*E21B 43/267* (2006.01)
*E21B 49/00* (2006.01)
*G05B 19/416* (2006.01)

(52) U.S. Cl.
CPC ............ *E21B 43/267* (2013.01); *E21B 43/26* (2013.01); *E21B 47/06* (2013.01); *E21B 47/065* (2013.01); *E21B 49/00* (2013.01); *G05B 19/416* (2013.01); *G05B 2219/41303* (2013.01)

(58) Field of Classification Search
CPC ..................................................... E21B 43/267
See application file for complete search history.

(56) References Cited

U.S. PATENT DOCUMENTS

| 4,828,028 A | 5/1989 | Soliman |
| 2007/0000666 A1 | 1/2007 | Vozniak et al. |
| 2007/0137862 A1* | 6/2007 | Stephenson ........... B01F 3/1271 166/305.1 |
| 2008/0164021 A1 | 7/2008 | Dykstra |
| 2012/0111563 A1 | 5/2012 | Abad et al. |
| 2013/0146292 A1 | 6/2013 | Litvinets et al. |

OTHER PUBLICATIONS

International Search Report and Written Opinion dated Aug. 14, 2014 for PCT Application No. PCT/US2013/070107 filed on Nov. 14, 2013. (11 Pages).

* cited by examiner

*Primary Examiner* — Robert E Fuller
(74) *Attorney, Agent, or Firm* — Chamberlain Hrdlicka (57) ABSTRACT

Fracturing systems and methods for increasing the conductivity of a flow path between a reservoir formation and a wellbore are presented that include varying a proppant concentration of a fracturing fluid in response to a measured characteristic from the wellbore during the fracturing process. During the injection of proppant pulses into the wellbore, one or more of a pulse length, pulse height, pulse shape, or duty cycle of the proppant concentration is varied. Other systems and methods are disclosed.

16 Claims, 7 Drawing Sheets

ADAPTATION OF FRACTURING FLUIDS

TECHNICAL FIELD

The present disclosure relates generally to oilfield drilling and production, and more particularly, to fracturing treatments of wellbores to enhance recovery of hydrocarbons from reservoir formations.

BACKGROUND

Well stimulation is utilized by the oil and gas industry to increase the transfer of hydrocarbon resources from a reservoir formation to a wellbore. Such stimulation typically relies on the introduction of a pressurized fracturing fluid into a wellbore. The pressurized fracturing fluid generates fractures downhole in the reservoir formation. As part of the process, fracturing fluid containing suspended proppant is injected into the wellbore to stabilize the fractures. The proppant helps fractures form reliable flow paths for the extraction of hydrocarbon resources.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same or coordinated reference numerals. The drawing figures are not necessarily to scale. Certain features of the invention may be shown exaggerated in scale or in somewhat schematic form and some details of conventional elements may not be shown in the interest of clarity and conciseness.

The embodiments described herein relate to systems and methods for increasing the conductivity of a flow path between a reservoir formation and a wellbore. More specifically, a fracturing system and methods are disclosed herein for varying a proppant concentration of a fracturing fluid in response to a measured characteristic from the wellbore. By varying the proppant concentration in response to measured characteristics from the wellbore, the acceptance of proppant into the flow path may be improved and enhanced control over the formation of pillar structures within the flow path may be achieved. Furthermore, the increase of fracturing fluid pressure beyond a safety threshold may be prevented.

As used herein, the term "proppant" refers to particulate solids which, during fracturing treatment of a reservoir formation, are blended into a fracturing fluid and transported downhole in a wellbore for placement within a fracture flow path. Non-limiting examples of particulate solids typically used as proppants include sand, bauxite, ceramics, or nut hulls. The particulate solids may be further coated with a curable resin, a pre-cured resin, a stress bond resin, or other adhesive compound. As used herein, the phrases "slurry", "proppant slurry", and "proppant gel" refer to a suspension of proppant within the fracturing fluid. The fracturing fluid may include dispersants to control agglomeration of the particulate solids, viscosity-enhancing additives to inhibit settling and modify flow behavior, and iron control agents to prevent the precipitation of metal oxides. Other chemicals and substances may be incorporated into the fracturing fluid in order to enhance fracture treatment of the reservoir formation.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings.

Figure 1:
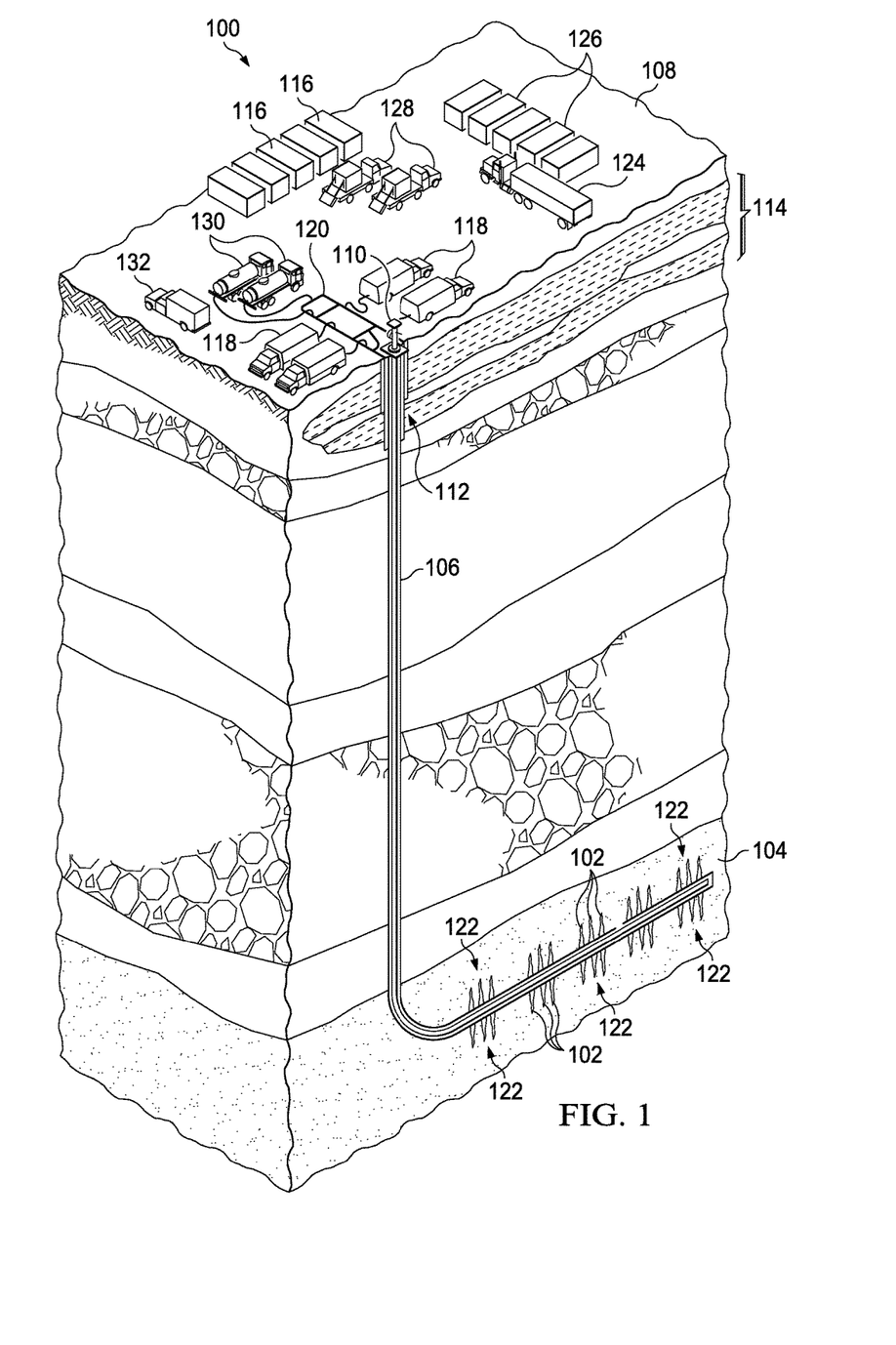
FIG. 1 is a schematic, perspective view, with a portion in cross-section, of an illustrative embodiment of a well system for increasing the conductivity of a flow path between a reservoir formation and a wellbore.

Referring now to the drawings, FIG. 1 illustrates a schematic, perspective view, with a portion shown in cross-section, of an illustrated embodiment of a well system 100 for increasing the conductivity of a flow path 102 between a reservoir formation 104 and a wellbore 106. The flow path 102, target reservoir formation 104, and wellbore 106 are shown in cross-section. FIG. 1 also provides a magnified, perspective view of the well system 100 at a surface 108 of the wellbore 106. At the surface 108, a wellhead 110 may cap the wellbore 106. The wellhead 110 terminates a series of concentric steel and cement encasements 112. The series of concentric encasements 112 protects higher-lying aquifer formations 114 during fracturing treatment of the wellbore 106.

The well system 100 surrounding the wellhead 110 may include fracturing-fluid storage tanks 116 and fracturing-fluid pumping trucks 118. Other means of storing and delivering fracturing-fluid might be used. The fracturing-fluid pumping trucks 118 receive fracturing fluid from the blending truck 128 or other source and inject, under pressure, fracturing fluid into the wellbore 106 through a conduit network 120 connected to the wellhead 110. Pressure exerted in the wellbore 106 by fracturing fluid adjacent the target reservoir formation 104 is sufficient to generate fractures, e.g., fractures 122, emanating from the wellbore 106 into the reservoir formation 104. These fractures 122 form flow paths 102 that enhance the conductivity of hydrocarbons out of the reservoir formation 104 and into the wellbore 106. This stage of fracturing treatment is often referred to as a "pad stage".

The flow paths 102, however, require stabilization to prevent collapse once pressurized injection of the fracturing fluid ceases. To address this situation, proppant may be introduced into the formation 104. For example, at the surface 108, a proppant truck 124 transfers proppant from proppant storage tanks 126 to blending trucks 128. The blending trucks 128 also receive fracturing-fluid from the fracturing-fluid storage tank 116. Proppant and fracturing fluid are mixed by the blending trucks 128 to form a blended fracturing fluid, sometimes referred to as a "slurry", "proppant slurry", or "proppant gel". In some embodiments, chemical trucks 130 may deliver solid or liquid chemicals to the blending trucks 128 for inclusion into the blended fracturing fluid. Other methods for chemical storage and delivery are possible (e.g., a hose connecting the blending trucks or blending equipment to a chemical storage tank). The blending trucks 128 operate in coordination with the fracturing-fluid pumping trucks 118 to inject blended fracturing fluid into the wellbore 106 through the wellhead 110. This coordination is operable to force the transport of proppant downhole under pressure and into the flow paths 102. The presence of proppant in the flow paths 102 provides structural support to prevent closure when pressurized injection from the surface 108 ceases. This stage of fracturing treatment is often referred to as a "proppant stage".

Coordination of the blending trucks and the fracturing-fluid pumping trucks is controlled by a data monitoring truck 132. While reference is made to trucks, one skilled in the art will appreciate that other equipment may be used for the same purpose. The data monitoring truck 132 is coupled to the blending trucks 128 and fracturing-fluid pumping trucks 118 to monitor pressures and flow rates associated with the blending trucks 128, the fracturing-fluid pumping trucks 118, the conduit network 120, and the wellhead 110. The data monitoring truck 132 may also coordinate the blending trucks 128 and the fracturing-fluid pumping trucks 118 to inject pressurized pulses of blended fracturing fluid in between volumes of clean fracturing fluid (i.e., containing no or insubstantial amounts of proppant). Such pulsing produces a pillar structure of proppant within the flow paths 102. The pillar structure contains open channels which enable a high conductivity of hydrocarbons out of the target reservoir formation 104 into the wellbore 106.

In several embodiments, the data monitoring truck 132 also monitors characteristics measured from the wellbore 106. Such characteristics include, but are not limited to, an amount of proppant injected into the wellbore 106, an amount of fracturing fluid injected into the wellbore 106, wellbore pressures, a wellbore pressure distribution, wellbore flow rates, changes in wellbore pressures, changes in wellbore flow rates, time rate-of-change in wellbore pressures, time rate-of-change in wellbore flow rates, tilt as measured by a tilt sensor proximate the wellbore, relationships between wellbore pressures and wellbore flow rates, wellbore temperatures, distributions of wellbore temperatures, acoustic transmissions within the wellbore 106, and lengths of the flow paths 102. As further explained below, the pulses of blended fracturing fluid may be adapted in response to characteristics measured from the wellbore to enhance the acceptance or beneficially control the introduction of proppant into the flow paths 102 of the reservoir formation 104.

Figure 2:
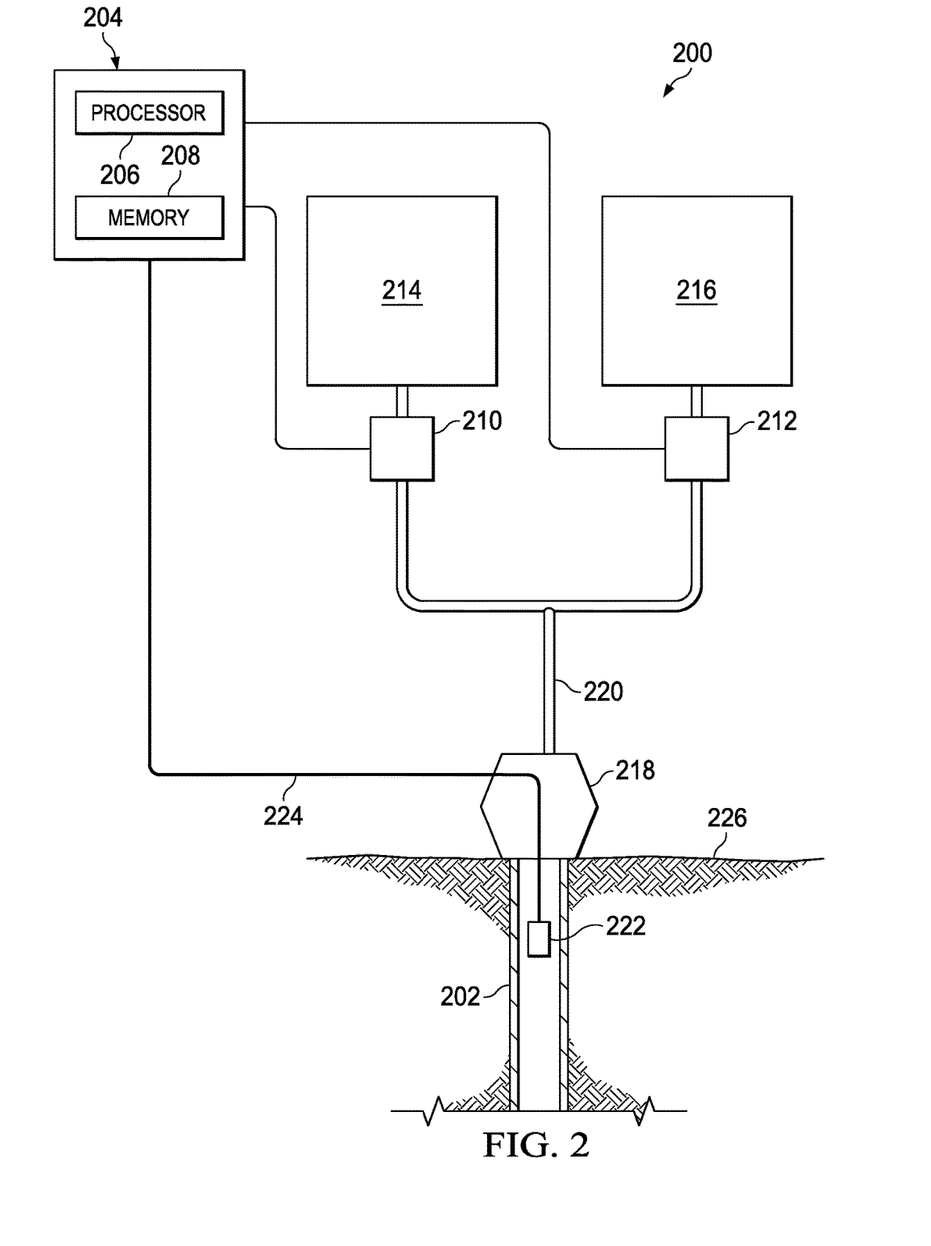
FIG. 2 is a schematic diagram of an illustrative embodiment of a fracturing system for increasing the conductivity of a flow path between a reservoir formation and a wellbore.

Now referring primarily to FIG. 2, a schematic diagram of an illustrated embodiment of a fracturing system 200 for increasing the conductivity of a flow path between a reservoir formation and a wellbore 202 is presented. The fracturing system 200 includes a computational unit 204, which in the embodiment of FIG. 1 is on monitoring truck 132 but could be anywhere. The computational unit 204 includes one or more processors 206 and one or more memories 208 and is meant to designate hardware used to implement the various illustrative blocks, modules, elements, components, methods and algorithms described herein. The one or more processors 206 are configured to execute one or more sequences of instructions, programming or code stored on a readable medium or memory. The processor 206 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. In some embodiments, the one or more memories are included with the one or more processor 206 and can include elements such as, for example, random access memory (RAM), flash memory, read only memory (ROM), programmable read only memory (PROM), erasable PROM), registers, hard disks, removable disks, CD-ROMS, DVDs, or any other like suitable storage device or memory device.

The computational unit 204 is coupled to a first-flow control device 210 and a second flow-control device 212. The first flow-control device 210 is fluidly-coupled with a proppant reservoir 214 and the second flow-control device 212 is fluidly-coupled with a fracturing-fluid reservoir 216. The first flow-control device 210 and the second flow-control device 212 are coupled to a wellhead 218 of the wellbore 202 by a conduit network 220. The computational unit 204 controls the first flow-control device 210 and second flow-control device 212 to form a blended fracturing fluid and vary the concentration of proppant in the blended fracturing fluid. The blended fracturing fluid is transported to the wellhead 218 by the conduit network 220. In some embodiments, the first flow-control device 210 includes an auger and the computational unit 204 varies the concentration of proppant in the blended fracturing fluid by controlling the motion of the auger.

The computational unit 204 is also coupled to a transducer 222 via a link 224. The link 224 enables communication of measurements from the transducer 222 to the computational unit 204. The link 224 may be achieved using a wireline, a fiber optic cable, mud pulse telemetry, wireless or other method. The transducer 222 is operational to measure a characteristic from the wellbore 202. The characteristic measured depends on the transducer type which may be, for example, without limitation, a pressure sensor, flow-rate sensor, a component-flow sensor for measuring flow of a component of the fluid, temperature sensor, acoustic sensor, density, dead weight system for packerless completions, etc. Other transducer types are possible. The characteristic may be a calculated value based on the transducer measurement. For example, the characteristic may be the result of a model of the formation that tries to predict how the formation will behave at some time in the future. FIG. 2 shows the transducer 222 located within the wellbore 202, slightly below a surface 226 of the wellhead 218. This depiction is not intended as a limiting. Other possible locations for the transducer 222 include the conduit network 220, the wellhead 218, or any position downhole within the wellbore 202. Furthermore, one or more transducers 222 may be utilized in one or more locations and may be of one or more types.

In operation, the transducer 222 measures a characteristic of the wellbore 202 and sends a signal representing the characteristic to the computational unit 204. The signal is communicated to the computational unit 204 using the link 224. The computational unit 204 receives the signal, and using one or more processors 206 and one or more memories 208, controls the first flow-control device 210 and the second flow-control device 212. The first flow-control device 210 regulates a first flow of proppant from the proppant reservoir 214 to the conduit network 220. In analogous manner, the second flow-control device 212 regulates a second flow of fracturing fluid from the fracturing fluid reservoir 216 to the conduit network 220. The first flow of proppant and the second flow of fracturing fluid enter the conduit network 220 to produce a blended fracturing fluid. The proportions of proppant and fracturing fluid are determined by the computational unit 204 in response to the signal or signals. The conduit network 220 delivers the blended fracturing fluid to the wellhead 218 which, in turn, directs the blended fracturing fluid into the wellbore 202. One or more pumps may be included as an aspect of the conduit network 220.

In combination with the computational unit 204, the transducer 222 may measure an amount of proppant injected into the wellbore 202, an amount of fracturing fluid injected into the wellbore 202, a wellbore pressure, a wellbore pressure distribution, a wellbore flow rate, a change in wellbore pressure, a change in wellbore flow rate, a time rate-of-change in wellbore pressure, a time rate-of-change in wellbore flow rate, a relationship between wellbore pressures and wellbore flow rates, a wellbore temperature, a distribution of wellbore temperatures, an acoustic transmission within the wellbore 202, or a length of the flow path. The computational unit 204 varies the concentration of proppant in the blended fracturing fluid in response to the measured characteristic.

In some embodiments, the measured characteristic is a pressure from the wellbore 202 and the computational unit 204 varies the concentration of proppant in the blended fracturing fluid in response to the pressure measurement from the transducer 222. In other embodiments, the pressure from the wellbore 202 is measured in coordination with a flow rate of fracturing fluid into the wellbore to determine a relationship between the pressure and the flow rate. The relationship may represent the ability of the reservoir formation to accept the proppant. The computational unit 204 varies the concentration of proppant in the blended fracturing fluid in response to the relationship between the pressure and flow rate.

Figure 3:
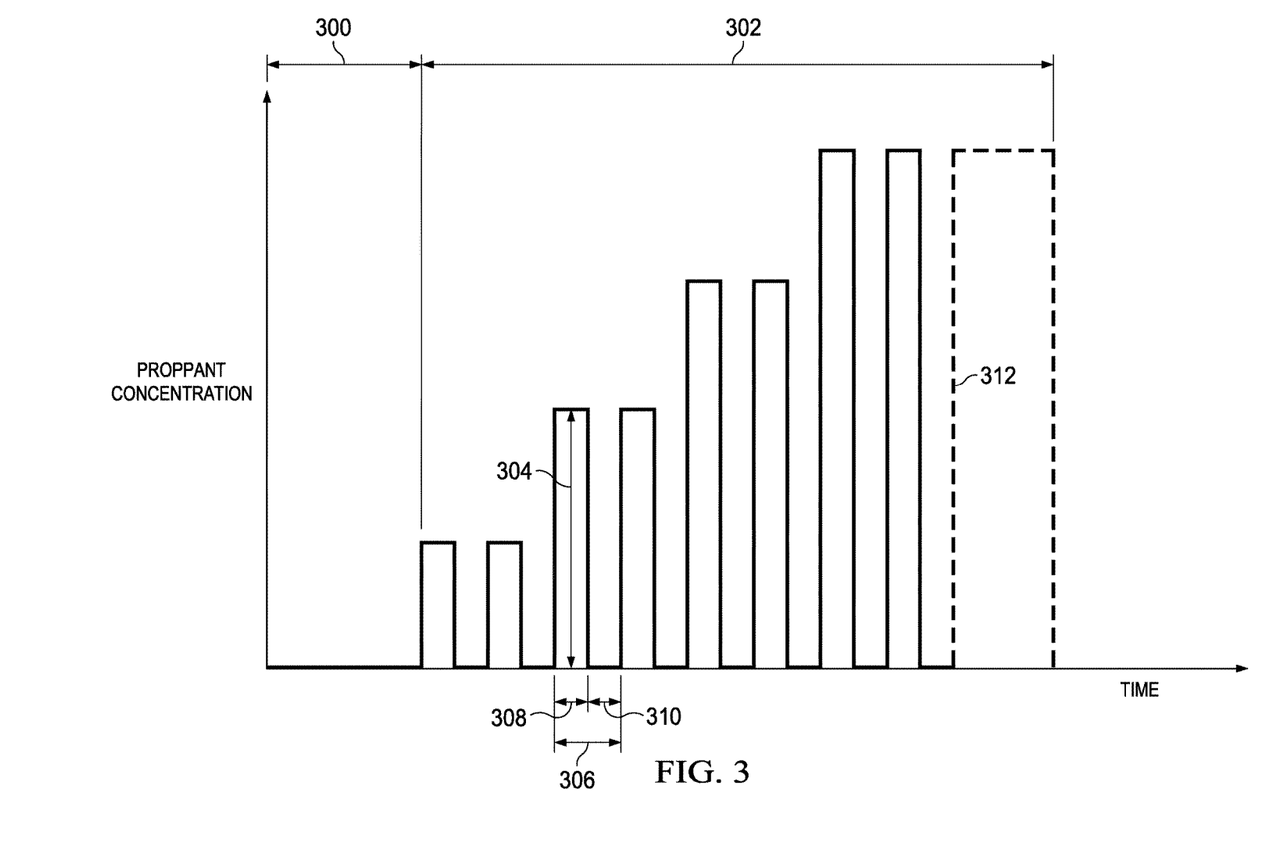
FIG. 3 is a schematic graph illustrating a variation of proppant concentration in a fracturing fluid with time according to one illustrative embodiment.

Now referring primarily to FIG. 3, a schematic graph is presented showing a variation of proppant concentration in a fracturing fluid with time according to one illustrative embodiment. The variation corresponds to a fracturing treatment wherein proppant is transported into a flow path of a wellbore in order to create an open-channel, pillar structure within the flow path. A pad stage 300 initiates the fracturing treatment. During the pad stage 300, the fracturing fluid is clean, i.e., contains no or insubstantial amounts of proppant. A proppant stage 302 follows and includes pulses of blended fracturing fluid separated by clean fracturing fluid. Pulses of the proppant stage 302 are defined by a pulse height 304, a pulse length 306, a proppant pulse length 308, and a clean-fluid pulse length 310. As the proppant stage 302 proceeds, the pulse height 304 progressively increases, corresponding to a progressive increase of proppant concentration in the blended fracturing fluid.

At the end of the proppant stage 302, a tail-in stage 312 may commence. The tail-in stage 312 typically includes blended fracturing fluid and proppant and creates a stable, uniform, and permeable connection between the flow path and the wellbore. For pulses of the proppant stage 302, a duty cycle may be calculated by dividing the proppant pulse length 308 by the pulse length 306 and multiplying by 100%. In FIG. 3 the proppant pulse length 308 and clean-fluid pulse length 310 are illustrated equal throughout so the duty cycle is a constant 50%. Other duty cycles are possible as described further below. It will be appreciated that the well system 100 of FIG. 1 and the fracturing system of 200 of FIG. 2 are capable of varying a concentration of proppant in a fracturing fluid to generate pulses of proppant concentration as depicted in FIG. 3.

Figure 4:
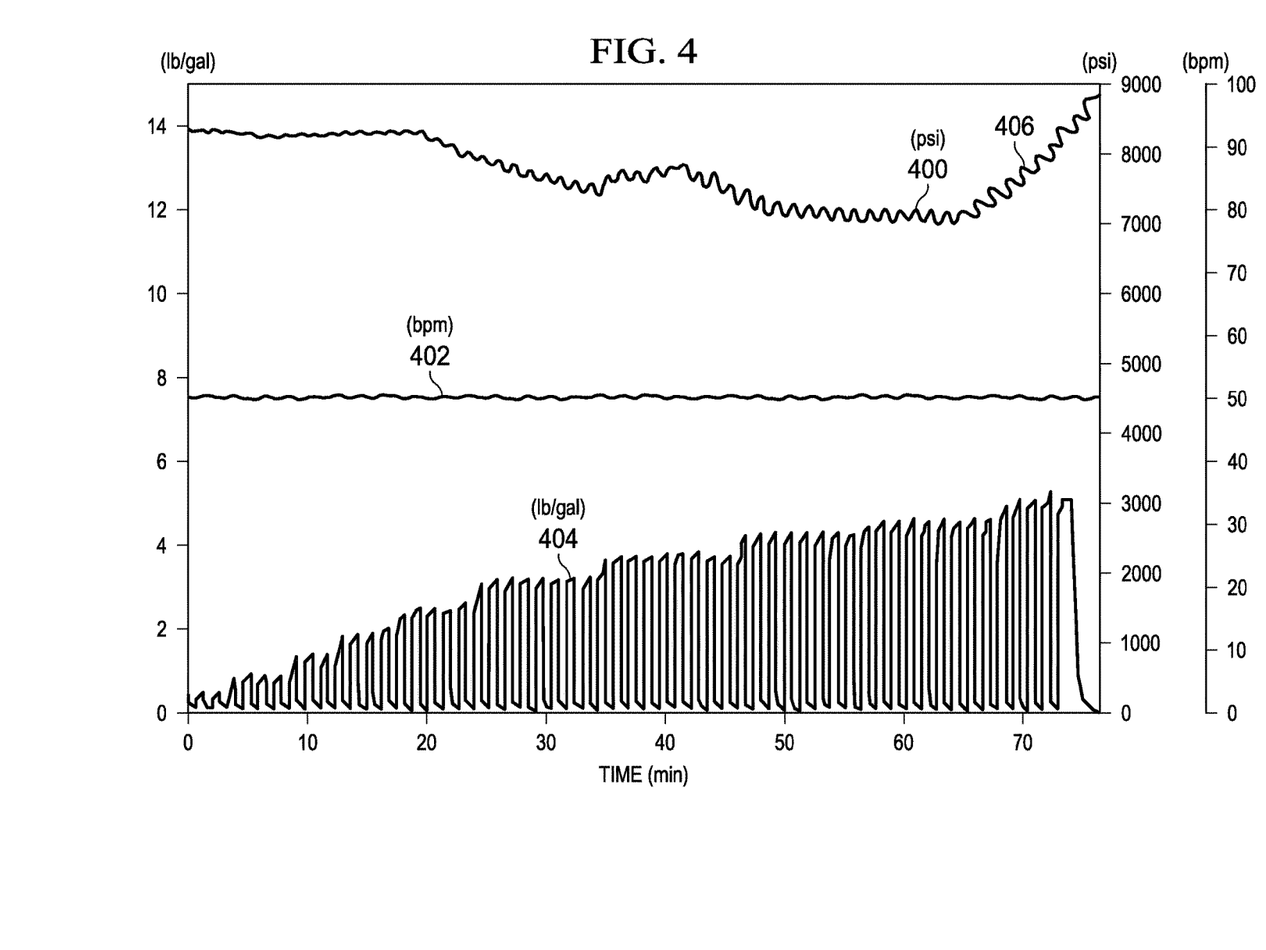
FIG. 4 is a schematic graph illustrating a pressure, a flow rate, and a proppant concentration of a fracturing fluid with time during fracturing treatment of a wellbore according to one illustrative embodiment.

FIG. 4 shows a schematic graph of data illustrating a pressure 400, a flow rate 402, and a proppant concentration 404 of a fracturing fluid over time during fracturing treatment of a wellbore. Only the proppant stage of the fracturing treatment is shown in FIG. 4. The flow rate 402 is sometimes referred to as the "dirty rate" because the flow-rate of the fracturing fluid may include proppant material. The duty cycle remains constant at approximately 50% as the proppant stage proceeds. A pulse height of the proppant concentration 404 increases progressively according to a predetermined schedule and is independent of changes in the pressure 400. The use of a predetermined schedule represents a conventional approach to fracturing treatment and includes a constant duty cycle, most commonly 50%. However, if the flow paths downhole accept proppant poorly during a conventional fracturing treatment, pressure in the wellbore may quickly rise beyond a safety threshold producing a pressure runaway 406. The integrity of the well and all connected equipment is then threatened. The fracturing treatment in the past has typically been aborted at this point and the wellbore returned to safe pressures. Halting a fracturing treatment results in a significant loss of time and incurs an undesirable economic cost. The systems and methods herein may avoid such a shutdown.

Figure 5:
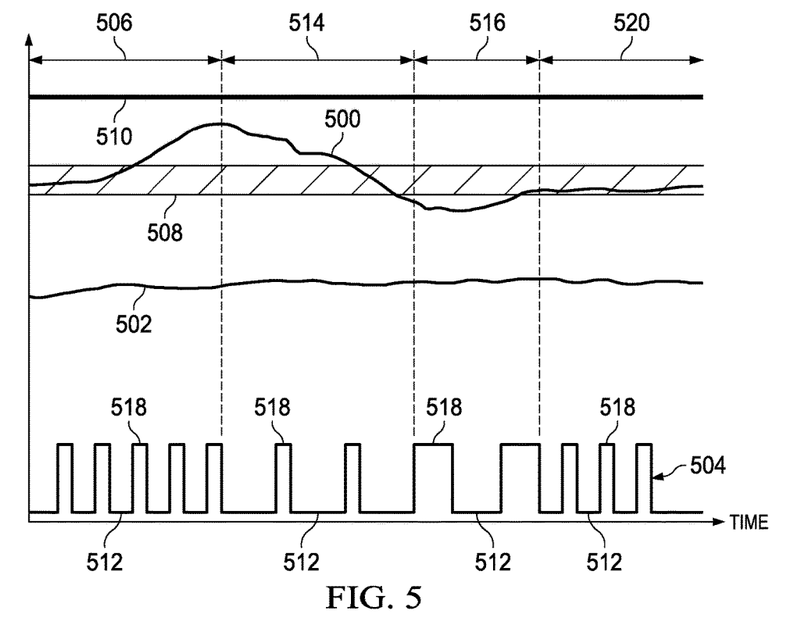
FIG. 5 is a schematic graph illustrating a variation of fracturing-fluid pressure, a dirty rate, and a proppant concentration with time during a proppant stage according to one illustrative embodiment.

FIG. 5 depicts one illustrative embodiment to address the limitations of a conventional fracturing treatment. This embodiment is capable of being employed by the well system 100 of FIG. 1 and the fracturing system 200 of FIG. 2 according to methods disclosed further below. In FIG. 5, a schematic graph illustrates a variation of fracturing-fluid pressure 500 with time during a proppant stage. A dirty rate 502 remains constant throughout the proppant stage. A proppant concentration curve 504 is shown to vary in response to the fracturing-fluid pressure 500.

During a first time period 506, the fracturing-fluid pressure 500 rises from a desired pressure range 508 towards a safety threshold 510. In response to the increase in fracturing-fluid pressure 500, a duty cycle of the proppant concentration 504 is varied by increasing the clean-fluid pulse length 512 during a second time period 514. The transport of proppant downhole is reduced, enabling a decrease in fracturing-fluid pressure 500. Toward the end of the second time period 514, the fracturing-fluid pressure 500 drops below the desired pressure range 508. In response, the duty cycle of the proppant concentration 504 is varied during a third time period 516 by increasing a proppant pulse length 518. The fracturing-fluid pressure 500 returns to the desired pressure range 508, stabilizing in a fourth time period 520. In the fourth time period 520, the duty cycle is varied again in response to stabilization of the fracturing-fluid pressure 500: the clean-fluid pulse length 512 and the proppant pulse length 518 have been altered back to original lengths found in the first time period 506.

While the embodiment depicted by FIG. 5 shows a variation of proppant concentration in response to a fracturing fluid pressure, other measured characteristics from a wellbore are possible and may be used or considered in adjusting the proppant concentration of the blended fracturing fluid. Examples of such measured characteristics include an amount of proppant injected into the wellbore, an amount of fracturing fluid injected into the wellbore, a wellbore pressure distribution, a wellbore flow rate, a change in wellbore pressure, a change in wellbore flow rate, a time rate-of-change in wellbore pressure, a time rate-of-change in wellbore flow rate, a relationship between wellbore pressures and wellbore flow rates, a wellbore temperature, a distribution of wellbore temperatures, an acoustic transmission within the wellbore, a length of the flow path, or other characteristic. Furthermore, FIG. 5 has been presented in the context of avoiding a safety threshold. Other contexts are possible. For example, other types of control could be used other than the control shown in FIG. 5. For example, proportional control, differential control, PID control, adaptive control, feedforward control, feedback control, model-based control, or any other type of control could be implemented. In one embodiment, a model-based control is used which predicts the behavior of the formation.

In some embodiments, a proppant concentration is varied to enhance an acceptance of proppant in a flow path between a formation reservoir and a wellbore. In other embodiments, a proppant concentration is varied to increase the conductivity of a flow path between a formation reservoir and a wellbore. Other benefits may be realized by the process of adjusting the proppant concentration of the blended fracturing fluid in response to characteristics in the wellbore. The adjustment may be made in real time or substantially in real time.

Figure 6:
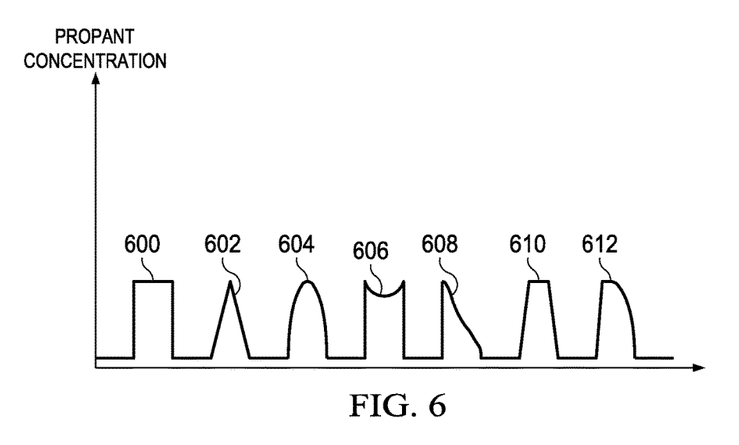
FIG. 6 is a schematic graph illustrating multiple embodiments of a pulse shape including a square pulse, a triangular pulse, a sinusoidal pulse, a meniscus pulse, a sawtooth pulse, a trapezoidal pulse, and a front-edged pulse.

The variation of proppant concentration may be accomplished by varying a duty cycle, a clean-fluid pulse length, a proppant pulse length, or a combination thereof. FIG. 6 illustrates non-limiting examples of pulse shapes that may be employed to vary the proppant concentration. In addition to a square pulse 600, a pulse shape may be selected from a triangular pulse 602, a sinusoidal pulse 604, a meniscus pulse 606, a sawtooth pulse 608, a trapezoidal pulse 610, or a front-edged pulse 612. Other pulse shapes are possible. The proppant concentration may be varied using any combination of pulse shapes. It will be appreciated that the well system 100 of FIG. 1 and the fracturing system of 200 of FIG. 2 are capable of generating various pulse shapes, such as those depicted in FIG. 6, in order to vary the proppant concentration of a fracturing fluid.

Figure 7A:
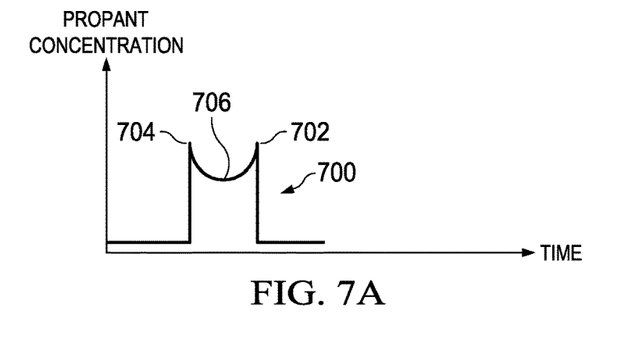
FIG. 7A is an illustrated embodiment of a meniscus pulse shape according to one illustrative embodiment.
Figure 7B:
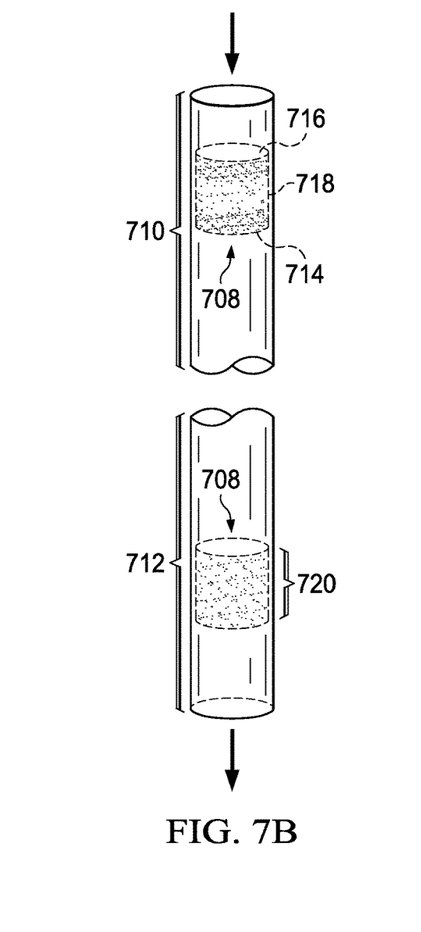
FIG. 7B is a schematic, elevational view of a proppant concentration pulse at a first wellbore section near a surface of the wellbore and at a second wellbore section near a reservoir formation of the wellbore according to one illustrative embodiment.

Pulse shapes and their combinations may be used to mitigate the effects of dispersion during transport downhole. While injection into a wellhead may occur with sharp boundaries between a blended fracturing fluid and a clean fracturing fluid, transport downhole to flow paths of a wellbore often suffers from a diffusion of suspended proppant into adjacent clean-fluid volumes. Such dispersion can interfere with the formation of distinct pillar structures within a flow path. FIG. 7A provides an illustrated embodiment of a meniscus pulse shape 700. A leading-edge cusp 702 and a trailing-edge cusp 704 mark, respectively, the beginning and ending boundaries of the meniscus pulse shape 700. A smooth, curved gradient having a local minimum 706 connects the leading-edge cusp 702 and the trailing-edge cusp 704. FIG. 7B shows a schematic, elevational view of the corresponding proppant concentration pulse 708 at a first wellbore section 710 near a surface of the wellbore and later at a second wellbore section 712 near a reservoir formation of the wellbore. A leading-edge 714 and a trailing edge 716 are formed of high proppant concentration relative to a center 718. The center 718 of the proppant concentration pulse 708 has a local minimum in proppant concentration. During transport downhole, high concentrations of proppant at the leading edge 716 and the trailing edge 718 diffuse outward into the clean fracturing fluid but also inward into the center 718. The resulting distribution of proppant concentration 720, upon delivery to a flow path, is more even and compact than if a standard square pulse had been produced. The meniscus pulse shape 700 therefore produces improved pillar structures that increase the conductivity of flow paths between a reservoir formation and the wellbore.

Embodiments varying a proppant concentration of the blended fracturing fluid have thus far been presented in the context of proppant concentration pulses. However, such embodiments are not intended as limiting. In some embodiments, variations of the proppant concentration generate a continuous curve and not discrete pulses. The proppant concentration is therefore varied continuously in response to a measured characteristic from the wellbore. In other embodiments, the clean fluid pulse length is eliminated to produce a series of connected proppant pulse lengths. For example, triangular pulses of proppant concentration may follow each other with no substantial separation by clean fluid fracturing fluid. In still other embodiments, one or more blended fracturing fluids may include one or more different proppants. Associated with each unique proppant is a proppant concentration. Multiple proppant concentrations may be therefore varied in response to one or more measured characteristics from the wellbore. Proppants may be selected based on material, coating, particle size, and shape. Other criteria may be used as needed by those skilled in the art.

Figure 8:
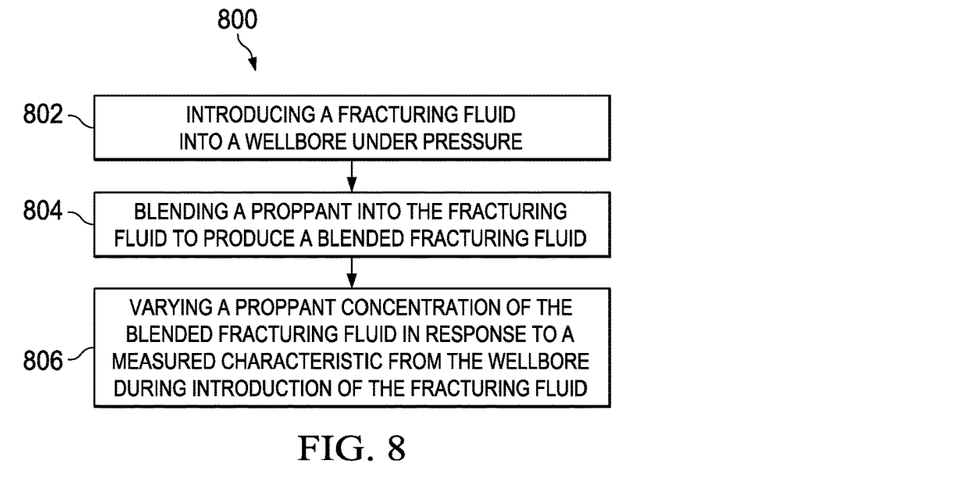
FIG. 8 is a schematic flowchart of an illustrative embodiment of a method for increasing the conductivity of a flow path between a reservoir formation and a wellbore.

Now referring primarily to FIG. 8, a schematic flow diagram of an illustrative embodiment of one method 800 for increasing the conductivity of a flow path between a reservoir formation and a wellbore is presented. The method 800 includes the step 802 of introducing a fracturing fluid into the wellbore under pressure. The method 800 also includes the step 804 of blending a proppant into the fracturing fluid to produce a blended fracturing fluid and the step 806 of varying a proppant concentration of the blended fracturing fluid in response to a measured characteristic from the wellbore during introduction of the fracturing fluid. In several embodiments, the step 806 of varying the proppant concentration occurs in real time in response to a measured characteristic from the wellbore. In other embodiments, the step 806 of varying the proppant concentration comprises varying at least one of a pulse length, a pulse height, a pulse shape, or a duty cycle of the proppant concentration.

Figure 9:
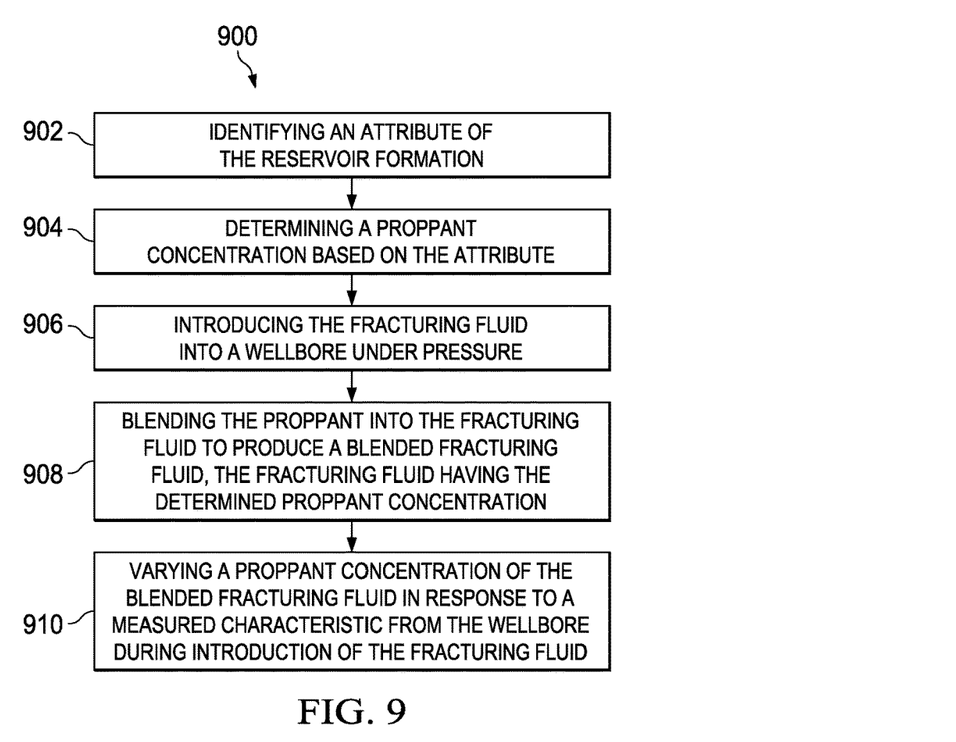
FIG. 9 is another schematic flowchart of an illustrative embodiment of a method for increasing the conductivity of a flow path between a reservoir formation and a wellbore.

Now referring primarily to FIG. 9, a schematic flow diagram of an illustrative embodiment of a method 900 is presented for increasing the conductivity of a flow path between a reservoir formation and a wellbore. The method 900 includes the step 902 of identifying an attribute of the reservoir formation. Attributes of the reservoir formation include a depth of the reservoir formation, a rock type of the reservoir formation, or a formation type of the reservoir formation. Other attributes are possible. Attributes of a reservoir formation may enable those skilled in the art to construct a model of the reservoir formation. The model may serve to determine an initial proppant concentration of a fracturing treatment. The model may also serve to identify characteristics from the wellbore that require measurement during a fracturing treatment.

The method 900 also includes the step 904 of determining a proppant concentration based on the attribute of the reservoir formation and step 906 of introducing a fracturing fluid into the wellbore under pressure. The method also involves the step 908 of blending a proppant into the fracturing fluid to produce a blended fracturing fluid. The blended fracturing fluid has the proppant concentration as determined in step 904. The method also includes the step 910 of varying the proppant concentration of the blended fracturing fluid in response to a measured characteristic from the wellbore during introduction of the fracturing fluid.

In some embodiments, the step 904 of determining a proppant concentration includes selecting a pulse length, pulse height, pulse shape, or duty cycle of the proppant concentration or some combination thereof and the step 910 of varying the proppant concentration comprises varying at least one of the pulse length, pulse height, pulse shape, or duty cycle. In other embodiments, the attribute of the reservoir formation is a depth of the reservoir formation. In still other embodiments, the attribute of the reservoir formation is a rock type of the reservoir formation, a formation type of the reservoir formation, or a combination thereof. In still other embodiments, the attribute of the reservoir formation is the flow regime of the fluid and includes laminar and turbulent calculations. In another embodiment, a numerical model is used to calculate the attribute of the reservoir formation that includes multiple parameters about the formation, the surface equipment, or the wellbore. In several embodiments, the step 910 of varying the proppant concentration occurs in real time in response to a measured characteristic from the wellbore.

The embodiments discussed in relation to FIG. 8 and FIG. 9 vary a proppant concentration in response to one or more measured characteristics of the wellbore. Examples of measured characteristics include an amount of proppant injected into the wellbore, an amount of fracturing fluid injected into the wellbore, a pressure of the fracturing fluid in the wellbore, a pressure distribution of the fracturing fluid in the wellbore, a flow rate of the fracturing fluid in the wellbore, a change in pressure of the fracturing fluid in the wellbore, a change in flow rate of the fracturing fluid in the wellbore, a time rate-of-change in pressure of the fracturing fluid in the wellbore, a time rate-of-change in flow rate of fracturing fluid in the wellbore, a relationship between pressure and flow rate of the fracturing fluid in the wellbore, a temperature of the fracturing fluid in the wellbore, a temperature distribution of the fracturing fluid in the wellbore, an acoustic transmission of the fracturing fluid in the wellbore, or a length of the flow path. In some embodiments, the acoustic transmission may be measured downhole by acoustic sensors distributed within the wellbore.

For the system and methods disclosed herein, the term "real time" refers to a response that occurs within the same time scale as that required to complete a measurement from the wellbore. For example, a pressure measurement completed within seconds would be followed by a response typically within seconds and not minutes. However, the term "real time" also includes practical considerations of the system implementing the method. For example, in the embodiment illustrated by FIG. 2, the fracturing system 200 may introduce a time delay that includes a time period for the link 224 to communicate a signal representing the measurement to the computational unit 204; a time period for the computational unit 204 to process the signal; a time period for the computational unit 204 to control the first flow-control device 210 and the second flow-control device 212; a time period for the first flow-control device 210 and the second flow-control device 212 to regulate the flow rate of, respectively, the proppant and the clean fracturing fluid; and a time period for the conduit network 220 to deliver blended fracturing fluid to the wellhead 218. Other time periods for the fracturing system 200 are possible. In certain embodiments, the system may also incorporate the response of one or more human operators. Additional time periods may be associated with each of these operators.

In addition to the illustrative embodiments described above, many examples of specific combinations are within the scope of the disclosure, some of which are detailed below.

Example 1

A method of increasing the conductivity of a flow path between a reservoir formation and a wellbore, the method comprising:

introducing a fracturing fluid into the wellbore under pressure;

blending a proppant into the fracturing fluid to produce a blended fracturing fluid; and varying a proppant concentration of the blended fracturing fluid in response to a measured characteristic from the wellbore during introduction of the fracturing fluid.

Example 2

The method of Example 1, wherein the step of varying the proppant concentration occurs in real time in response to a measured characteristic from the wellbore.

Example 3

The method of Example 1 or Example 2, wherein the step of varying the proppant concentration comprises varying at least one of a pulse length, a pulse height, a pulse shape, or a duty cycle of the proppant concentration.

Example 4

The method of Example 1, wherein the measured characteristic is a pressure of the fracturing fluid in the wellbore.

Example 5

The method of Example 1, wherein the measured characteristic is a change in pressure of the fracturing fluid in the wellbore.

Example 6

The method of Example 1, wherein the measured characteristic is a pressure distribution of the fracturing fluid in the wellbore.

Example 7

The method of Example 1, wherein the measured characteristic is a flow rate of the fracturing fluid in the wellbore.

Example 8

The method of Example 7, wherein the measured characteristic further comprises a pressure of the fracturing fluid in the wellbore.

Example 9

The method of Example 1, wherein the measured characteristic is a temperature of the fracturing fluid in the wellbore or a tilt measurement from a tilt sensor proximate the wellbore.

Example 10

The method of Example 1, wherein the measured characteristic is a temperature distribution in the wellbore.

Example 11

The method of Example 1, wherein the measured characteristic is an acoustic transmission of the fracturing fluid in the wellbore.

Example 12

The method of Example 11, wherein the acoustic transmission is measured downhole by acoustic sensors within the wellbore.

Example 13

A method of increasing the conductivity of a flow path between a reservoir formation and a wellbore, the method comprising:
  identifying an attribute of the reservoir formation;
  determining a proppant concentration based on the attribute of the reservoir formation;
  introducing a fracturing fluid into the wellbore under pressure;
  blending a proppant into the fracturing fluid to produce a blended fracturing fluid, the blended fracturing fluid having the determined proppant concentration; and
  varying the proppant concentration of the blended fracturing fluid in response to a measured characteristic from the wellbore during introduction of the fracturing fluid.

Example 14

The method of Example 13, wherein the step of varying the proppant concentration occurs in real time in response to the measured characteristic from the wellbore.

Example 15

The method of Example 13 or Example 14, wherein the step of determining a proppant concentration comprises selecting a pulse length, pulse height, pulse shape, or duty cycle of the proppant concentration or some combination thereof and wherein the step of varying the proppant concentration in comprises varying at least one of the pulse length, pulse height, pulse shape, or duty cycle.

Example 16

The method of Example 13, wherein the attribute is a depth of the reservoir formation.

Example 17

The method of Example 13, wherein the attribute is a rock type of the reservoir formation, a formation type of the reservoir formation, or a combination thereof.

Example 18

The method of Example 13, wherein the attribute is developed using a numerical model of the wellbore and formation.

Example 19

A system for increasing the conductivity of a flow path between a reservoir formation and a wellbore, the system comprising:
  a computational unit;
  a proppant reservoir;
  a fracturing-fluid reservoir;
  a first flow-control device associated with the proppant reservoir and coupled to the computational unit;
  a second flow-control device associated with the fracturing-fluid reservoir and coupled to the computational unit;
  a transducer coupled to the computational unit for measuring a characteristic of the wellbore; and
  wherein the computational unit comprises at least one processor and at least one memory, the computational unit operable to vary a proppant concentration of a blended fracturing fluid in response to the characteristic of the wellbore by controlling the first flow-control device and the second flow-control device.

Example 20

The system of Example 19, wherein the first flow device comprises an auger and the computational unit varies the proppant concentration by controlling motion of the auger.

Example 21

The system of Example 19, wherein the transducer comprises a pressure transducer and wherein the computational unit varies the proppant concentration by varying the concentration in response to the pressure measurement.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

We claim:

1. A method of increasing the conductivity of a flow path between a reservoir formation and a wellbore, the method comprising:
   introducing a fracturing fluid into the wellbore under pressure;
   blending a proppant into the fracturing fluid to produce a blended fracturing fluid; and
   varying a proppant concentration during each pulse of the blended fracturing fluid in real time in response to a measured characteristic from the wellbore during introduction of the fracturing fluid, wherein the measured characteristic comprises a change in pressure of the fracturing fluid in the wellbore.

2. The method of claim 1, wherein the step of varying the proppant concentration further comprises varying at least one of a pulse length, a pulse height, or a duty cycle of the proppant concentration.

3. The method of claim 1, wherein the measured characteristic is a pressure of the fracturing fluid in the wellbore.

4. The method of claim 1, wherein the measured characteristic further comprises a pressure distribution of the fracturing fluid in the wellbore.

5. The method of claim 1, wherein the measured characteristic further comprises a flow rate of the fracturing fluid in the wellbore.

6. The method of claim 1, wherein the measured characteristic further comprises a tilt measurement from a tilt sensor proximate the wellbore.

7. The method of claim 1, wherein the measured characteristic further comprises a temperature distribution in the wellbore.

8. The method of claim 1, wherein the measured characteristic further comprises an acoustic transmission of the fracturing fluid in the wellbore.

9. The method of claim 8, wherein the acoustic transmission is measured downhole by acoustic sensors within the wellbore.

10. A method of increasing the conductivity of a flow path between a reservoir formation and a wellbore, the method comprising:
    identifying an attribute of the reservoir formation;
    determining a proppant concentration based on the attribute of the reservoir formation;
    introducing a fracturing fluid into the wellbore under pressure;
    blending a proppant into the fracturing fluid to produce a blended fracturing fluid, the blended fracturing fluid having the determined proppant concentration; and
    varying the proppant concentration during each pulse of the blended fracturing fluid in real time in response to a measured characteristic from the wellbore during introduction of the fracturing fluid, wherein the measured characteristic comprises a change in pressure of the fracturing fluid in the wellbore.

11. The method of claim 10, wherein the step of determining a proppant concentration comprises selecting a pulse length, pulse height, pulse shape, or duty cycle of the proppant concentration or some combination thereof and wherein the step of varying the proppant concentration further comprises varying at least one of the pulse length, pulse height, or duty cycle.

12. The method of claim 10, wherein the attribute is a depth of the reservoir formation.

13. The method of claim 10, wherein the attribute is selected from one or more of the following: a rock type of the reservoir formation, a formation type of the reservoir formation, and a numerical model of the wellbore and formation.

14. A system for increasing the conductivity of a flow path between a reservoir formation and a wellbore, the system comprising:
    a computational unit;
    a proppant reservoir;
    a fracturing-fluid reservoir;
    a first flow-control device associated with the proppant reservoir and coupled to the computational unit;
    a second flow-control device associated with the fracturing-fluid reservoir and coupled to the computational unit;
    a transducer coupled to the computational unit for measuring a characteristic of the wellbore, the characteristic comprising a change in pressure of the fracturing fluid in the wellbore; and
    wherein the computational unit comprises at least one processor and at least one memory, the computational unit operable to vary a proppant concentration during each pulse of a blended fracturing fluid in real time in response to the characteristic of the wellbore by controlling the first flow-control device and the second flow-control device.

15. The system of claim 14, wherein the first flow device comprises an auger and the computational unit varies the proppant concentration by controlling motion of the auger.

16. The system of claim 14, wherein the transducer comprises a pressure transducer.

* * * * *